Mar. 13, 1923.
J. HESS ET AL.
ICE CREEPER FOR AUTOMOBILES.
FILED MAR. 25, 1922.
1,448,347.
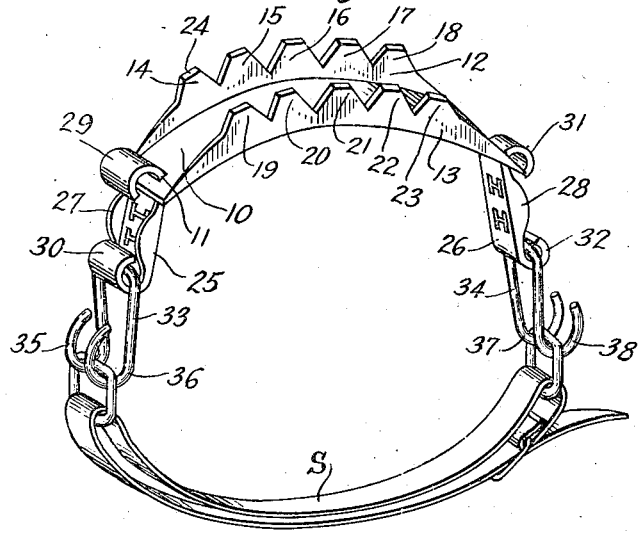
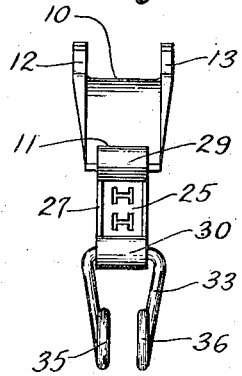
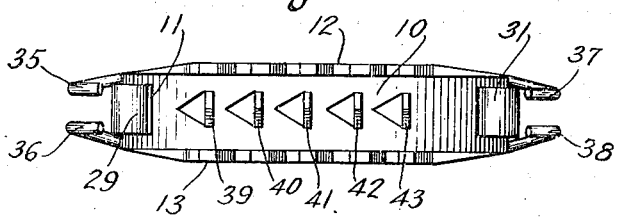
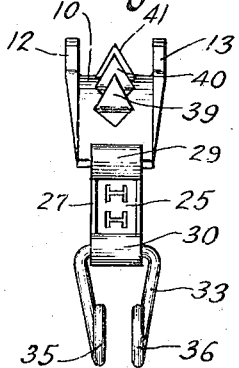
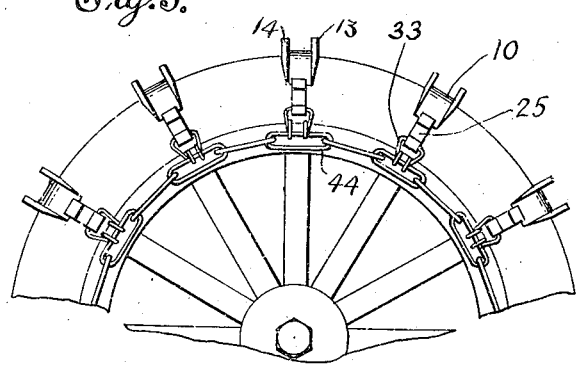
INVENTOR
John Hess, Norman W. Hyatt
BY Arthur Phelps Marr
ATTORNEY Patented Mar. 13, 1923.

1,448,347

UNITED STATES PATENT OFFICE.

JOHN HESS AND NORMAN W. HYATT, OF PORT JERVIS, NEW YORK.

ICE CREEPER FOR AUTOMOBILES.

Application filed March 25, 1922. Serial No. 546,544.

*To all whom it may concern:*

Be it known that we, JOHN HESS and NORMAN W. HYATT, citizens of the United States, and residents of Port Jervis, county of Orange, State of New York, have invented new and useful Improvements in Ice Creepers for Automobiles, of which the following is the specification.

The device, the subject of this invention is intended as a means adapted to be temporarily secured over the tread of an automobile tire, for the purpose of maintaining traction when the tire is passing over ice, snow or other slippery surfaces.

Another object is to provide a means that may operate as a substitute for the tire chain and which is made up in integral sections, so that a greater or lesser surface of the tread may be covered by the device and a still further object of the invention is to provide a means that can be so readily attached or detached from the tire as to encourage its use only at a time that such use is necessary or advisable, thus saving wear upon the tire, the device or the roads.

Another and important object of the invention is to provide a device cheap in construction and light and of integral formation, so that if one device wears or breaks, another may be readily substituted, or the broken member removed without removing the entire series, if a series are employed, thus obviating the inconvenience of chain repairs on the road.

With these and other objects in view, the following is what we consider the best means for carrying out this invention and the accompanying drawing should be referred to for a complete understanding of the specification which follows:

In the drawing:

Fig. 1, is a perspective view of the complete device.

Fig. 2, a side elevation thereof.

Fig. 3, a slightly modified form, and

Fig. 4, a side elevation thereof.

Fig. 5, is a fragmentary view of a wheel, showing our device secured thereon, the device here shown is still further modified.

Similar reference numerals indicate like parts in all the figures where they appear.

In the drawing we have included an ordinary chain or strap by means of which, our device is secured over a tire. This chain or strap should be secured between the hooks shown depending at each side of our device and which will be later described in detail.

The top member of our device consists of a plate 10, oblong in shape and arched to conform to the shape of the tire with which it is to operate. At each end of the plate, we provide slots or oblong perforations as shown at 11.

The edges of the plate are upturned as shown at 12 and 13 and in each upturned edge we produce a plurality of teeth 14, 15, 16, 17, 18 and 19, 20, 21, 22, and 23. The tops of the teeth are flattened as indicated at 24. The number of teeth may be changed at will and the area of the teeth will be determined by the length of the plate and the number of teeth produced.

It is our desire to form the plates 10 of sheet steel or other suitable material and engaged in the slots at each end of the plate are short plate links as shown at 25 and 26. The sides of these links are upturned as shown at 27 and 28 and at each end we produce loops 29, 30, 31 and 32. One loop of each of the plates 25 and 26 will be engaged in the oblong perforation or slot, which are described as provided at each end of the larger plate 10 and into the other loops 30 and 32, we engage wire hooks as shown at 33 and 34. These hooks are for simplicity of construction, each formed of a continuous piece of wire of U-shape, the base of the U being engaged in the loop of the short plate and the ends of the arms of the U-shape members being turned to produce hooks as shown at 35, 36, 37, and 38, and it is between these hooks 35 to 38 inclusive that the straps S will extend, which is depended upon to secure our device in operative position.

We have previously stated that this device is particularly intended to be used on ice, snow or other slippery surfaces.

There may be a tendency for ice or snow to pack between the up-standing edges of the plate 10. To overcome this and to increase the engaging surface, we may provide additional projections 39, 40, 41, 42 and 43 formed integral with and extending through the midlength of the plate 10.

These additional projections 39 to 43 inclusive may be triangular tongues, cut upon two sides over the plate 10 and bent upward or outward until the free points or the apex of the triangle extend approximately to the length or height of the teeth 14 to 23 inclusive and we desire it understood that while we prefer the outer teeth and the inner projections in combination, the teeth may be depended upon and the projections omitted or the projections alone may be employed. Rope or wire cable may be employed in lieu of the strap S for securing our device in operative position.

In Fig. 5, we have shown a chain 44 extending around the wheel and approximately adjacent the felly thereof. This chain may be made of rather long links, into the alternate links of which our device is engaged and as shown in this figure, the teeth in the upturned flanges 13 and 14 may be omitted and while we do not recommend the omission of the teeth, we have found that the device without teeth will operate very satisfactorily as a mud hook or traction device for soft surfaces and modifications may be made within the scope of the appended claim without departing from the principle or sacrificing the advantages of the invention.

Having carefully and fully described our invention what we claim and desire to obtain by Letters Patent is as follows:—

A device of the character described, comprising a plate, projections therefrom, a plate link arranged at each end thereof, each of the said plate links being formed with upstanding edges, loops at the ends thereof one of said loops being engaged in said plate.

Signed at the city, county and State of New York, this 22d day of March, 1922.

JOHN HESS.
NORMAN W. HYATT.